H. N. FOUNTAIN.
DRILLING RIG.
APPLICATION FILED JUNE 20, 1919.

1,370,498.

Patented Mar. 1, 1921.

Inventor
H. N. Fountain,
By
Attorney

United States patent office.

HAROLD N. FOUNTAIN, OF CLAREMORE, OKLAHOMA.

DRILLING-RIG.

1,370,498.

Specification of Letters Patent.   Patented Mar. 1, 1921.

Application filed June 20, 1919. Serial No. 305,491.

*To all whom it may concern:*

Be it known that I, HAROLD N. FOUNTAIN, a citizen of the United States of America, residing at Claremore, in the county of Rogers and State of Oklahoma, have invented new and useful Improvements in Drilling-Rigs, of which the following is a specification.

The object of the invention is to provide a simple and efficient means for facilitating the mounting and dismounting of the pitman of a drilling machine with reference to the operating crank under such conditions as to insure the communication of motion to the pitman without liability of accidental disconnection or displacement of the interlocking means.

With this object in view the invention consists in the construction specifically set forth in the accompanying drawing wherein.

Figures 1, 2, 3:
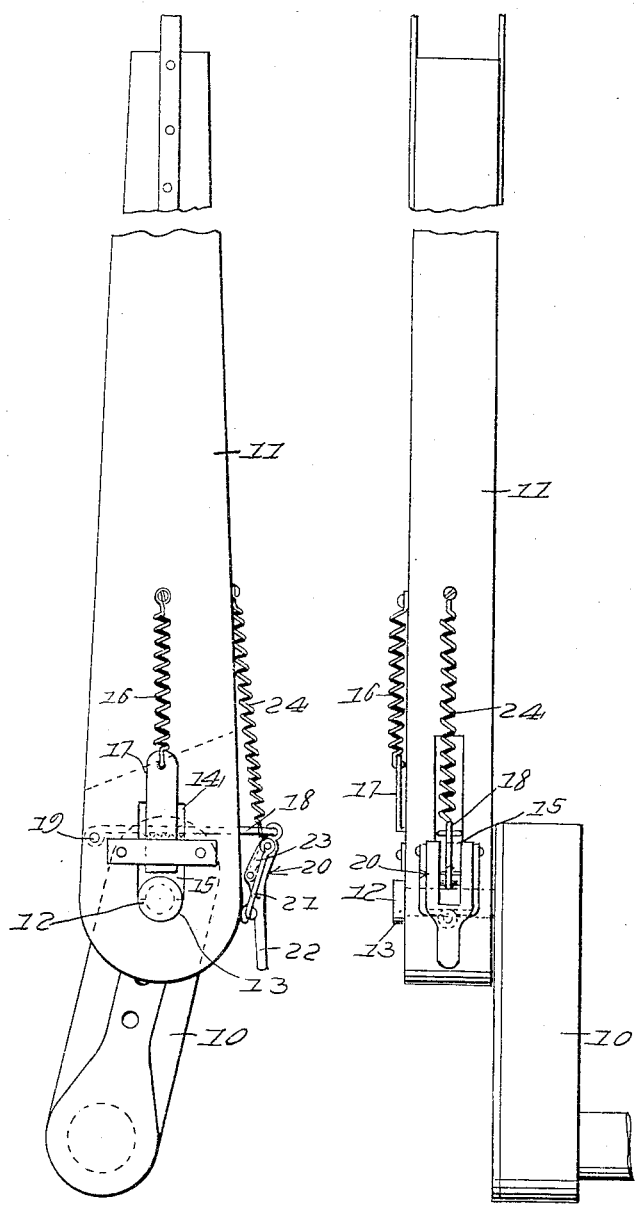
Figure 1 is a side view of a pitman and crank provided with a locking device embodying the invention.
Fig. 2 is an edge view of the same.
Fig. 3 is a side view of the crank end of the pitman showing the parts of the mounting in the disconnected position.

The crank 10 and pitman 11 illustrated in the drawing are of the ordinary but may be of any preferred construction wherein the former is provided with the wrist pin 12 for engagement by a seat 13 in the latter, said seat being formed at the lower end of a slot 14 to facilitate the proper relative arrangement of the parts.

Mounted in the slot for movement toward the seat 13 is a follower 15 provided in its end side with a complementary element of the bearing for engagement with the wrist pin 12 which is preferably turned down at an intermediate point to form a journal as in the ordinary practice. The follower block is yieldingly retracted by means of springs 16 connected with arms 17 disposed adjacent to the side surfaces of the pitman, and disposed in operative relation with the follower is a retaining rod or member 18 pivoted as at 19 and connected at its other end with a tightener 20 consisting of a swinging link 21 in the free end of which is mounted a lever 22 connected at an intermediate point with the extremity of the rod 18 by a second link 23 so that when the operating element or lever 22 is swung from the position indicated in Fig. 3 to that shown in Fig. 1 the retaining member 18 is depressed at its free end to carry with it the follower block and bring the latter into bearing engagement with the wrist pin. A return spring 24 is preferably connected with the free end of the retaining member to raise it and thus release the follower when the tightener is thrown from the eccentric position indicated in Fig. 1 to release the wrist pin. It will be noted that the springs respectively connected with the follower and retaining member serve to maintain them in out of the way relation to the bearing in the pitman so as to facilitate the engagement of the latter with the wrist pin of the crank after which the movement of the tightener lever 22 to its depressed position locks the wrist pin in place in the bearing of the pitman.

The invention having been described, what is claimed as new and useful is:

The combination with a pitman and crank respectively having a bearing and wrist pin for reception by the bearing, the pitman being formed with a slot the lower end of which constitutes the said wrist pin bearing, of a follower block slidably mounted in said slot and bearing against the wrist pin, arms connected with the follower block and disposed adjacent the side surfaces of the pitman, a spring tensioned between the extremity of the arm and a point on the pitman, tending normally to draw the follower block away from the wrist pin, a retaining rod pivotally connected with the pitman and spanning the slot formed therein above the follower block, a spring connected with the retaining rod and tending normally to retract the same to permit actuation of the follower block spring, and a tightener for the retainer rod consisting of a swinging link and a lever connected at an intermediate point with the extremity of the rod, the tightener operating in opposition to the retracting spring for the retaining rod, whereby the operation of the lever embodied in the tightener may immediately result in the retraction of the follower block in the manner and for the purpose specified.

In testimony whereof I affix my signature.

HAROLD N. FOUNTAIN.